Figure 1:
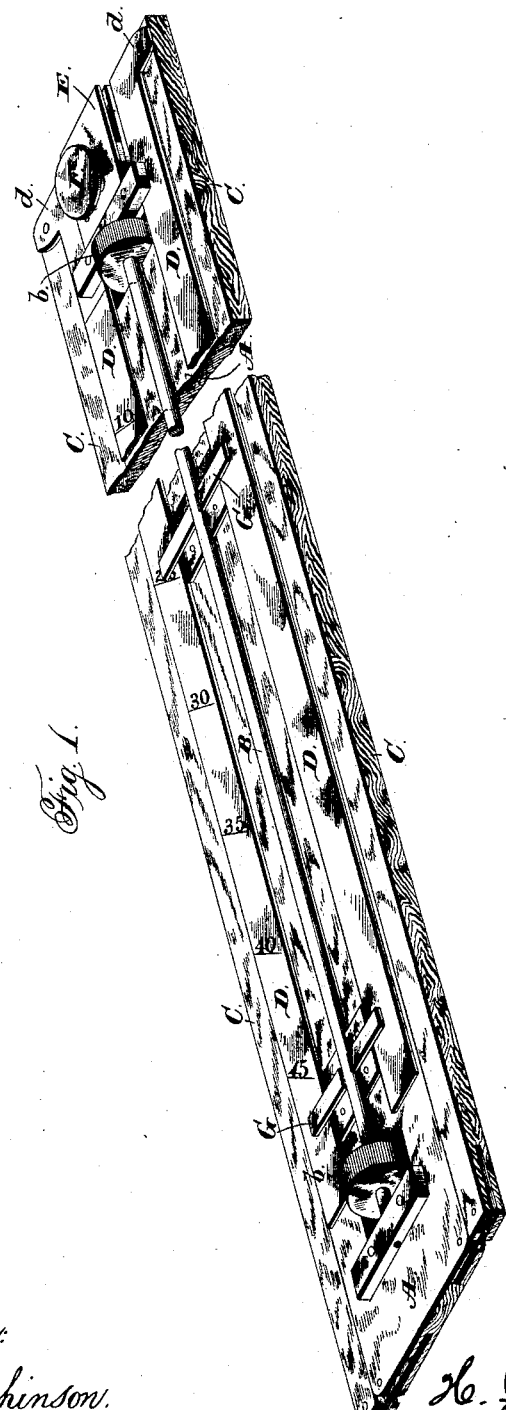

(No Model.)　　　　　　　　　　　　　　　　　2 Sheets—Sheet 1.
H. J. EISEN.
PARALLEL RULER.

No. 374,462.　　　　　　　　　　Patented Dec. 6, 1887.

Witnesses:
Jas. E. Hutchinson.
Henry C. Hazard.

Inventor:
H. J. Eisen, by
Prindle and Russell, his Attys (No Model.) 2 Sheets—Sheet 2.
H. J. EISEN.
PARALLEL RULER.
No. 374,462. Patented Dec. 6, 1887.
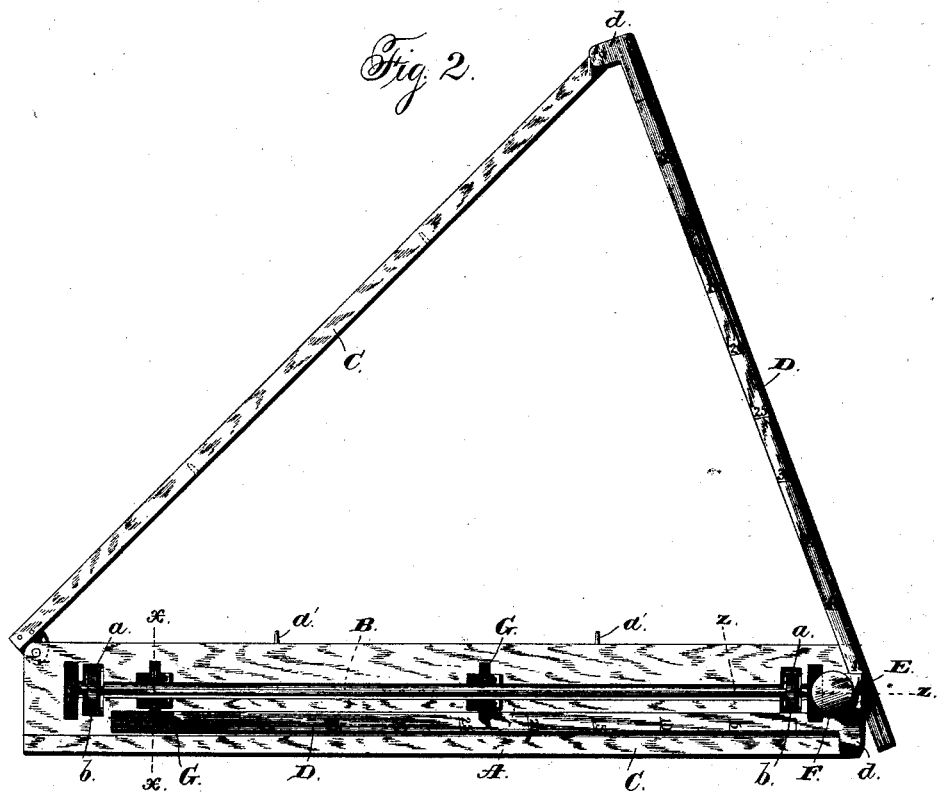
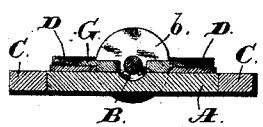
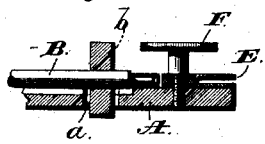
Witnesses:
Jas. E. Hutchinson.
Henry C. Hazard.
Inventor.
H. J. Eisen, by
Crindle & Russell, his Attys

UNITED STATES PATENT OFFICE.

HERMAN J. EISEN, OF WATERBURY, CONNECTICUT.

PARALLEL-RULER.

SPECIFICATION forming part of Letters Patent No. 374,462, dated December 6, 1887.

Application filed July 1, 1887. Serial No. 243,192. (No model.)

*To all whom it may concern:*

Be it known that I, HERMAN J. EISEN, of Waterbury, in the county of New Haven, and in the State of Connecticut, have invented certain new and useful Improvements in Rulers; and I do hereby declare that the following is a full, clear, and exact description thereof, reference being had to the accompanying drawings, in which—

Figure 1 is a perspective view of my ruler as arranged for use in the ruling of horizontal parallel lines. Fig. 2 is a plan view of the same when arranged for ruling diagonal parallel lines. Fig. 3 is a cross-section upon line $x\ x$ of Fig. 2, and Fig. 4 is a longitudinal section upon line $z\ z$ of same figure.

Letters of like name and kind refer to like parts in each of the figures.

The design of my invention is to enable diagonal parallel lines having any desired angle with reference to a base-line to be easily and accurately ruled; and to this end said invention consists, principally, in a ruler which is supported by and moves upon connected rollers, in combination with a jointed arm that is pivoted at one end of one of its sections to said ruler, and is adapted to have its opposite section clamped to or upon the opposite end of the ruler, substantially as and for the purpose hereinafter specified.

It consists, further, in the details of construction, substantially as and for the purpose hereinafter shown.

In the application of my invention to practice I employ a flat ruler, A, which has parallel side edges, and upon one side of the same journal a rod or shaft, B, that is provided near each end with a roller, $b$. The rollers $b$ and $b$ are secured rigidly to the shaft B, have the same diameter, and preferably have their peripheries milled. Each of the same is partially contained within a suitable slot, $a$, in the ruler, and projects through the same sufficiently to form a rolling-bearing for and upon which said ruler may be moved, in the usual manner. The shaft B being parallel with the edges of the ruler A, and the rollers $b$ and $b$ connected together and compelled to rotate in the same time, it will be seen that when said ruler is moved over a plane surface its edges will maintain parallelism with the line occupied by them at the starting-point.

Pivoted at one end to each edge and at relatively opposite ends of the ruler A are two bars, C and C, each of which corresponds to the latter in length and thickness, and preferably has about one-fourth the width of the same. Each bar is adapted to have its free end turned outward until its edges occupy any desired position with relation to the edge of said ruler between parallelism and an angle of ninety degrees, and when closed against the same is held in place by means of pins $a'$, which project from the edge of said ruler into corresponding openings (shown by dotted lines) within the contiguous edge of said bar. Pivoted upon the upper side, at the free end of each bar C, is another bar, D, which is preferably made from sheet metal and has but a fraction of the thickness of the former. Said bar D has substantially the width and nearly the length of said bar C, and at its pivotal end is provided with a lateral offset, $d$, which operates to throw its body upon the upper side of the ruler A when said bar or arm C is closed inward against the latter, as seen in Figs. 1 and 2.

The arm C is intended for use in ruling diagonal lines, and the bar D operates as a locking-brace for insuring the position of the former when set at the desired angle. To accomplish this, said brace is turned to the position shown in Fig. 2, with its body extending across the end of the ruler A, beneath a clamping-plate, E, when, by means of a screw, F, said plate may be pressed firmly down upon and caused to confine the brace in position. By loosening said clamp-screw said brace-bar is again free to be moved longitudinally beneath said clamp, so as to change the relative angle of the bar or arm C.

In order that the edge of the arm C may be easily and accurately set at any desired angle with relation to the ruler A, the brace D is provided with a scale that extends between its ends upon its upper side, and each division-line is marked with figures, which indicate the relative angle occupied by said arm C when such line is caused to coincide with the edge of the clamp-plate E, or with any similar stationary point.

When the pivoted arms are folded against the edges of the ruler, their outer edges are parallel with the edges of said ruler, and may be used as though said arms constituted part of or were permanently attached in such position to said ruler.

The locking-braces D and D, when not in use, are each held in position by means of two or more lugs, G, which are secured upon said ruler and project horizontally over said brace.

Having thus described my invention, what I claim is—

1. A ruler which is supported by and moves upon connected rollers, in combination with a jointed arm that is pivoted at one end of one of its sections to said ruler and is adapted to have its opposite section clamped to or upon the opposite end of the ruler, substantially as and for the purpose specified.

2. A ruler which is supported by and adapted to be moved upon parallel rollers, in combination with an arm that is pivoted at one end to the edge at one end of the ruler and is adapted to be folded against or set at any desired angle to the edge of the same, and means, substantially as shown, whereby said arm may be locked in place when adjusted thereto, substantially as and for the purpose set forth.

3. The combination of the ruler supported by and movable upon parallel rollers, the ruling-arm pivoted at one end upon the end of said ruler, the locking-brace pivoted upon the free end of said arm, and means, substantially as shown, whereby said brace may be clamped in position and caused to support said arm in position with relation to said ruler, substantially as and for the purpose described.

4. The combination of the ruler supported by and movable upon parallel rollers, the ruling-arm pivoted at one end upon one end of said ruler, the locking-brace pivoted at one end upon the free end of said arm, and the clamping-plate and screw which are adapted to confine said brace in position upon the end of said ruler, substantially as and for the purpose specified.

In testimony that I claim the foregoing I have hereunto set my hand this 25th day of June, 1887.

HERMAN J. EISEN.

Witnesses:
GEO. E. TERRY,
NATHL. R. BRONSON.